United States Patent [19]
Katayama

[11] Patent Number: 5,831,882
[45] Date of Patent: Nov. 3, 1998

[54] ORTHOGONAL TRANSFORMATION PROCESSING DEVICE

[75] Inventor: Yoichi Katayama, Tokyo, Japan

[73] Assignee: NEC Corporation, Tokyo, Japan

[21] Appl. No.: 611,943

[22] Filed: Mar. 7, 1996

[30] Foreign Application Priority Data

Mar. 7, 1995 [JP] Japan .................................. 7-047535

[51] Int. Cl.$^6$ .................................................. G06F 17/14
[52] U.S. Cl. ................................ 364/725.03; 364/726.07
[58] Field of Search ........................ 364/725.01, 725.03, 364/736.01–736.03, 750.5, 726.07

[56] References Cited

U.S. PATENT DOCUMENTS

| | | | |
|---|---|---|---|
| 4,945,506 | 7/1990 | Baji et al. ........................... | 364/736.03 |
| 4,949,292 | 8/1990 | Hoshino et al. .................... | 364/736.03 |
| 5,278,781 | 1/1994 | Aono et al. ......................... | 364/736.02 |
| 5,493,521 | 2/1996 | Oota .................................... | 364/736.03 |

OTHER PUBLICATIONS

Texas Instruments, "Third–Generation TMS320 User's Guide", Digital Signal Processor Products (undated).

Lee, "A New Algorithm to Compute the Discrete Cosine Transform", IEEE Transactions on Acoustics, Speech, and Signal Processing, vol. ASSP–32, No. 6, pp. 1234–1245, (1984).

Chen et al., "A Fast Computational Algorithm for the Discrete Cosine Transform", IEEE Transactions on Communications, vol. Com–25, No. 9, pp. 1004–1009, (1977).

NEC, MOS Integrated Circuit PD77230A–003 (undated).

*Primary Examiner*—Tan V. Mai
*Attorney, Agent, or Firm*—Foley & Lardner

[57] ABSTRACT

When adding a first data and a second data, a selection circuit outputs the first data and a constant number 1 to a multiplication circuit and the second data to an addition circuit. When subtracting the second data from the first data, the selection circuit outputs the first data and a constant number −1 to the multiplication circuit and the second data to the addition circuit. When multiplying the first data by the second data, the selection circuit outputs the first data and the second data to the multiplication circuit and a constant number zero to the addition circuit. The multiplication circuit multiplies two input values and outputs a result to the addition circuit. The addition circuit adds the two input values.

20 Claims, 7 Drawing Sheets

FIG. 2

| STEP | ARITHMETIC AND LOGIC OPERATION | MULTIPLICATION, ADDITION AND SUBTRACTION OPERATION |
|---|---|---|
| 1 | A1 | M1 |
| 2 | A2 | M3 |
| 3 | A3 | A4 |
| 4 | A5 | M2 |
| 5 | A6 | M4 |
| 6 | A7 | A8 |
| 7 | A9 | M5 |
| 8 | A10 | M6 |
| 9 | A11 | A12 |
| 10 | A13 | M7 |
| 11 | A14 | M8 |
| 12 | A15 | A16 |
| 13 | A17 | A18 |
| 14 | A19 | A20 |
| 15 | A21 | M9 |
| 16 | A22 | M10 |
| 17 | A23 | M11 |
| 18 | A24 | M12 |
| 19 | A25 | A26 |
| 20 | A27 | A28 |
| 21 | A29 | - |

FIG. 4

| STEP | ARITHMETIC AND LOGIC OPERATION | MULTIPLICATION, ADDITION AND SUBTRACTION OPERATION |
|---|---|---|
| 1 | A1 | M1 |
| 2 | A2 | (M1) |
| 3 | A3 | M3 |
| 4 | A4 | (M3) |
| 5 | A5 | M2 |
| 6 | A6 | (M2) |
| 7 | A7 | M4 |
| 8 | A8 | (M4) |
| 9 | A9 | M5 |
| 10 | A10 | (M5) |
| 11 | A11 | M6 |
| 12 | A12 | (M6) |
| 13 | A13 | M7 |
| 14 | A14 | (M7) |
| 15 | A15 | M8 |
| 16 | A18 | (M8) |
| 17 | A19 | M9 |
| 18 | A20 | (M9) |
| 19 | A21 | M10 |
| 20 | A16 | (M10) |
| 21 | A17 | M11 |
| 22 | A22 | (M11) |
| 23 | A23 | M12 |
| 24 | A24 | (M12) |
| 25 | A25 | A26 |
| 26 | A27 | A26 |
| 27 | A28 | A29 |
| 28 | - | (A29) |

FIG. 7
(PRIOR ART)

| STEP | ARITHMETIC AND LOGIC OPERATION | MULTIPLICATION, ADDITION AND SUBTRACTION OPERATION |
|---|---|---|
| 1 | A1 | M1 |
| 2 | A2 | M3 |
| 3 | A3 | - |
| 4 | A4 | - |
| 5 | A5 | M2 |
| 6 | A6 | M4 |
| 7 | A7 | - |
| 8 | A8 | - |
| 9 | A9 | M5 |
| 10 | A10 | M6 |
| 11 | A11 | - |
| 12 | A12 | - |
| 13 | A13 | M7 |
| 14 | A14 | M8 |
| 15 | A15 | - |
| 16 | A16 | - |
| 17 | A17 | - |
| 18 | A18 | - |
| 19 | A19 | M9 |
| 20 | A20 | M10 |
| 21 | A21 | M11 |
| 22 | A22 | M12 |
| 23 | A23 | - |
| 24 | A24 | - |
| 25 | A25 | - |
| 26 | A26 | - |
| 27 | A27 | - |
| 28 | A28 | - |
| 29 | A29 | - |

ORTHOGONAL TRANSFORMATION PROCESSING DEVICE

BACKGROUND OF THE INVENTION

This invention relates to an orthogonal transformation processing device and, more particularly, to an art of orthogonal transformation used for signal processing of pictures or voices.

As typical orthogonal transformations used for signal processing, Discrete Sine Transformation (referred to as DST, hereinafter) and Discrete Cosine Transformation (referred to as DCT, hereinafter) are known. DCT is popularly used for coding moving pictures and voices.

The present invention can be generally applied to orthogonal transformations. To simplify explanations, however, the present invention is explained based on DCT and Inverse Discrete Sine Transformation (referred to as IDCT, hereinafter).

DCT is popularly used in the field of signal processing. So far, many algorithms have been proposed for accelerating calculations for the signal processing. For example, there are "A fast computational algorithm for the discrete cosine transform" by W. H. Chen, C. H. Smith and S. C. Fralick, IEEE Trans. Commun. vol. COM. 25, pp. 1004–1009, September, 1977 and "A new Algorithm to Compute the Discrete Cosine Transform" by Byeong Gi Lee, IEEE Trans. on Acoustics, Speech, and Signal Processing, Vol. ASSP—32, No. 6, pp. 1243–pp. 1245, December, 1984. In these high-speed algorithms, addition and subtraction are effectively repeated and multiplication circuits are reduced as little as possible.

For processing moving pictures, IDT is popularly used for extending compressed data. In the following explanations, an IDCT high-speed algorithm is mainly explained. IDCT is an inverse transformation of a DCT high-speed algorithm, and it is essentially the same as DCT. So, it does not go out of the range of the present invention if the explanation is focused to the IDCT high-speed algorithm.

N degree IDCT is represented by the equation (1), referring to the definition by Byeong Gi Lee.

$$f(j) = \sum_{i=0}^{N-1} e(j)F(i)\cos\frac{(2i+1)j\pi}{2N} \quad (1)$$

where, e(j) is represented as below:

$$e(j) = \frac{1}{\sqrt{2}} \quad (j = 0) \quad (2)$$

$$= 1 \quad (j \neq 0) \quad (3)$$

For example, the Lee's IDCT high-speed algorithm in a case of N=8 that is popularly used for moving pictures lock processing in the above equation 1) is represented by FIG. 5. FIG. 5 shows calculations and a sequence for inputting 8 input data, F(0), F(1), F(2), F(3), F(4), F(5), F(6), F(7) and outputting 8 output data of IDCT transformed values, f(0), f(1), f(2), f(3), f(4), f(5), f(6), f(7). Addition, subtraction and multiplication are represented by +, − and ×, respectively. The dot beside the mark − that represents subtraction shows an input of a subtracting value. The letters A1 to A29 and M1 to M12 beside the operation marks +, − and × are codes to discriminate the operations. Ck ($1 \leq k \leq 7$) represents a coefficient described by the following equation.

$$C_k = \frac{1}{2\cos\frac{k\pi}{2 \times 8}} \quad (4)$$

In FIG. 5, for example, the addition A4 shows to input the data F(2) and F(6) indicated by the arrows, calculate the addition F(2)+F(6), and output the result.

In addition, in FIG. 5, the multiplication M2 shows to multiply the output of the addition A4 by the coefficient C4, and output the result.

Moreover, in FIG. 5, the subtraction A9 shows to subtract the result of multiplication M2 from F(2) (that is, F(2)− the result of multiplication M2: a dot indicates a subtracting value), and output the result. According to the operations in FIG. 5, 8 degree IDCT results, f(0), f(1), f(2), f(3), f(4), f(5), f(6), f(7) are calculated from 8 input data, F(0), F(1), F(2), F(3), F(4), F(5), F(6), F(7) through 29 different additions and subtractions and 12 different multiplications. This is a brief explanation of an example of a high-speed DCT algorithm.

In FIG. 6, a prior orthogonal transformation processor described in Third-Generation TMS320 User's Guide (Texas Instruments) and the NEC device data sheet (NEC Corporation) is shown.

The prior orthogonal transformation processor comprises a multiport register file 30, an arithmetic and logic operation circuit (ALU) 10 conducting addition and subtraction of data stored in the multiport register file 30, a ROM 40 for storing coefficients and multiplication circuit 201 for calculating multiplication of data themselves stored in the multiport register file 30 or multiplying data stored in the multiport register file 30 by the data stored in the ROM 40. Furthermore, it comprises a switch 50 for selecting data stored in the multiport register file 30, supplying the data to the arithmetic and logic operation circuit 10 and the multiplication circuit 201 and selecting to store again the output results of the both operation circuits to a place instructed by the multiport register file 30.

The multiplication circuit 201 comprises a partial product generation circuit (PPGC) 202 for calculating a partial product of an upper bit side of a multiplier and a multiplicand or a partial product of a lower bit side of a multiplier and a multiplicand, a total adder circuit 211 for adding output results of the above partial product generation circuit 202, a high-speed adder circuit 221 for calculating total partial products from the outputs of the total adder circuit 211 and a register 241 for storing the calculation result of the high-speed adder circuit 221.

In case of IDCT processing that is a kind of orthogonal transformation according to the high-speed algorithm shown by FIG. 5 using a prior orthogonal transformation processor of FIG. 6, the input data, F(0), F(1), F(2), F(3), F(4), F(5), F(6), F(7) are stored to the multiport register file 30 and the coefficients Ck ($1 \leq k \leq 7$) are stored to the ROM 40 in advance, respectively.

According to the calculation procedure of FIG. 5, for example, first the arithmetic and logic operation circuit 10 performs the addition A1 shown in FIG. 5, that is, F(5)+F(3), and the multiplication circuit 201 performs the multiplication M1, that is, F(4)×C4.

In the next step, the arithmetic and logic operation circuit 10 performs the addition A2, that is, F(1)+F(3), and the prior orthogonal transformation processor calculates the high-speed algorithm shown in FIG. 5.

FIG. 7 shows high-speed algorithm calculation steps in the above prior orthogonal transformation processor as an example In this example of FIG. 7, one multiplication operation needs two steps. In this example, a pipeline operation is possible, so data entry for each step is also possible. In FIG. 7, the mark − of multiplication operation shows that multiplication operation is not performed during that step. By FIG. 7, it is possible to understand that the orthogonal transformation processor of FIG. 6 needs a total of 29 steps for performing 8 degree IDCT processing.

The number of multiplication operations is fewer than that of addition and subtraction operations in the Lee's high-speed algorithm, so the arithmetic and logic operation circuit 10 of the prior orthogonal transformation processor performs operation in all steps. However, the multiplication circuit 202 does not necessarily perform operation in all steps. That is, the work rate of the multiplication circuit 202 is lower than that of the arithmetic and logic operation circuit 10, like the earlier—described prior processor. In FIG. 7, here, supposing the work rate for all steps of the arithmetic and logic operation circuit 10 and the multiplication circuit 202 in the Lee's high-speed algorithm processing be a rate of number of steps in which a calculation circuit works per total number of steps, the work rate of the arithmetic and logic operation circuit 10 is shown as below:

$$29/29 \times 100 = 100\%$$

while, the work rate of the multiplication circuit 202 is shown as below:

$$12/29 \times 100 = 41\%.$$

Generally, the size of a multiplication circuit is larger than that of an arithmetic and logic operation circuit. So, there has been a problem that a large size multiplication circuit is not used effectively.

SUMMARY OF THE INVENTION

It is an object of the present invention to provide solutions for the aforementioned problems.

It is another object of the present invention to provide a processing device having improved efficiency to realize high-speed orthogonal transformation.

It is still another object of the present invention to provide a processing device improved in reduction of size of hardware, adding the above acceleration of speed.

The objects of the present invention are achieved by an orthogonal transformation processing device comprising:
multiplication means;
addition means;
selection means, in which a first data, a second data, a constant number 1, a constant number −1 and a constant number zero are input, for:
outputting the first data and the constant number 1, to the multiplication means as well as outputting the second data to the addition means when adding the first data and the second data;
outputting the first data and the constant number −1, to the multiplication means as well as outputting the second data to the addition means when subtracting the first data from the second data;
outputting the first data and the second data, to the multiplication means as well as outputting the constant number zero to the addition means when multiplying the first data by the second data; and
wherein the multiplication means multiplies two input values and outputs a multiplication result to the addition means, the addition means adds the multiplication result and a value output from the selection means and outputs a result.

Moreover, the objects of the present invention are achieved by an orthogonal transformation processing device for orthogonal transformation processing, comprising a first selection means, a second selection means, data division means, multiplication means, addition means and a register for storing an operation result of the addition means, wherein
the first selection means:
inputs a first data, a second data, a constant number 1 and a constant number −1;
outputs the first data to the data division means, outputs the constant number 1 to the multiplication means and outputs the second data to the second selection means when adding the first data and the second data;
outputs the first data to the data division means, outputs the constant number −1 to the multiplication means and outputs the second data to the second selection means when subtracting the first data from the second data;
outputs the first data to the data division means and outputs the second data to the multiplication means when multiplying the first data by the second data;
the data division means divides the first data to N (N is a natural number) bit strings and outputs them in N cycles;
the second selection means:
outputs the second data to the addition means only in one cycle within the N cycles and outputs a calculation result of the addition means stored in the register to the addition means in the other cycles than that one cycle, when adding the first data and the second data;
outputs the second data to the addition means only in one cycle within the N cycles and outputs a calculation result of the addition means stored in the register to the addition means in the other cycles than that one cycle, when subtracting the first data from the second data;
outputs the constant number zero to the addition means only in one cycle within the N cycles and outputs a calculation result of the addition means stored in the register to the addition means in the other cycles than that one cycle, when multiplying the first data by the second data; and
the multiplication means multiplies input two values and outputs a calculation result to the addition means; and
the addition means adds the multiplication result and a value output from the second selection means and outputs a result to the register.

The present invention comprising addition and subtraction means inputs data to a multiplication circuit even other than the case for multiplication operation. Thus, it can perform addition and subtraction when multiplication is not needed, resulting in improved efficiency of usage of operation circuits and reducing number of steps necessary to perform calculation.

In addition, the present invention needs smaller size of hardware than that of a prior orthogonal transformation processor by using a partial multiplication circuit having a smaller size than the prior one as a multiplication circuit.

BRIEF DESCRIPTION OF THE DRAWINGS

This and other objects, features and advantages of the present invention will become more apparent upon a reading of the following detailed description and drawings, in which:

FIG. 2 is a figure showing an example of a program realizing an inverse cosine transformation high-speed algorithm by using the first embodiment;

FIG. 4 is a figure showing an example of a program realizing an inverse cosine transformation high-speed algorithm by using the second embodiment;

FIG. 7 is a figure showing an example of a program realizing an inverse cosine transformation high-speed algorithm by using a prior orthogonal transformation processor.

DESCRIPTION OF THE PREFERRED EMBODIMENTS

Figure 1:
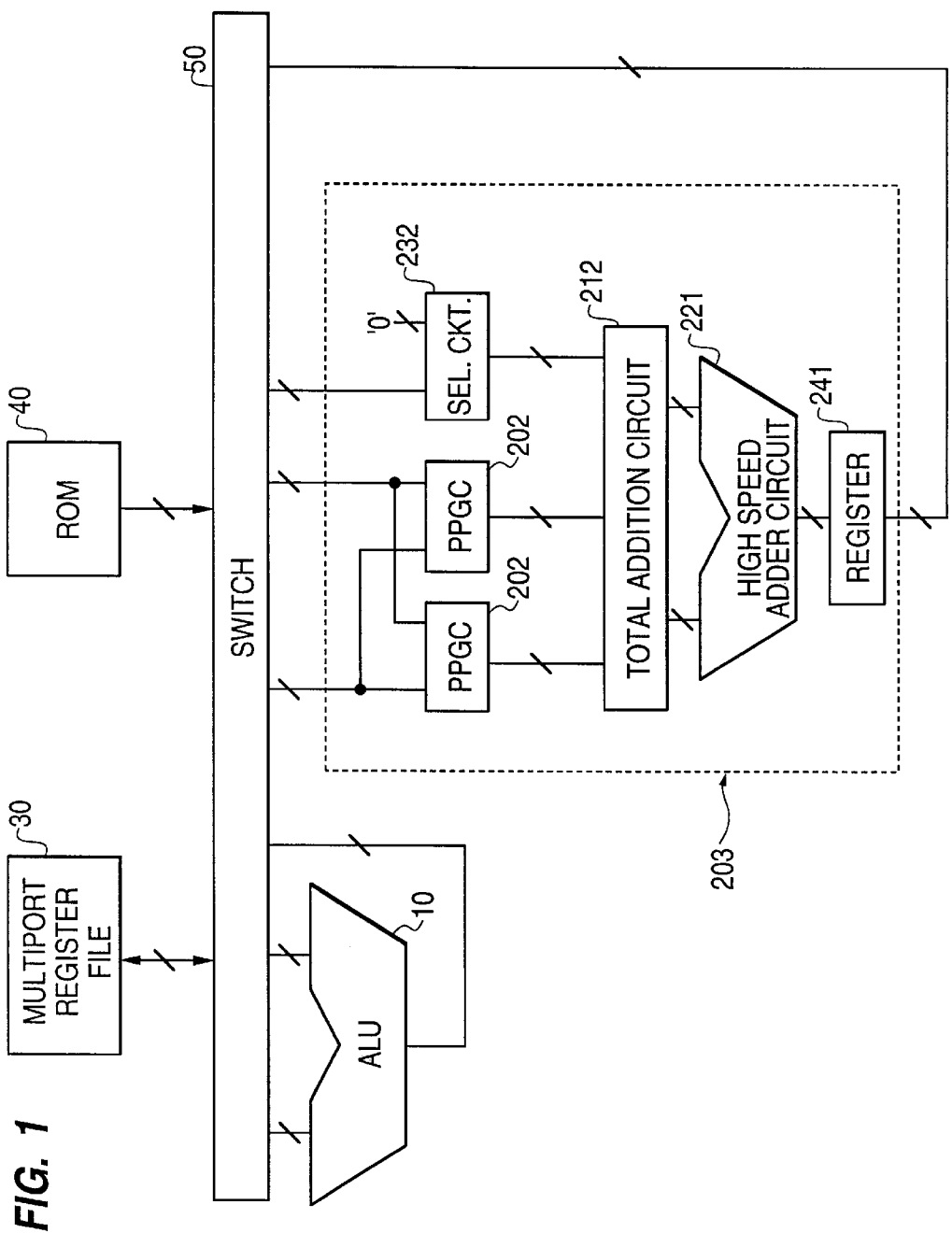
FIG. 1 is a block diagram of a first embodiment of the present invention.

An embodiment of the present invention is described referring to the drawings.

FIG. 1 is a block diagram of a first embodiment of the present invention.

In this figure, 10 is an arithmetic and logic operation circuit (ALU) for operating addition or subtraction.

40 is a ROM for storing coefficients.

30 is a multiport register file for supplying data to a switch 50 described later and storing output data from the arithmetic and logic operation circuit 10 and an addition, subtraction and multiplication circuit 203.

50 is a switch for supplying data from the ROM 40 and the multiport register file 30 to the arithmetic and logic operation circuit 10 and the addition, subtraction and multiplication circuit 203, according to a pre-installed program. This switch also supplies calculation results of the arithmetic and logic operation circuit 10 and the addition, subtraction and multiplication circuit 203 to the multiport register file 30.

202 is a partial product generation circuit (PPGC) for outputting a partial product of a multiplier and a multiplicand.

241 is a register for storing results of multiplication, addition or subtraction.

232 is a selection circuit for selecting a value zero when multiplication is performed, or selecting a side of an added number or a subtracted number input from the switch 50 when addition or subtraction is performed.

212 is a total addition circuit that inputs the outputs from the partial product generation circuit 202 and the selection circuit 232.

221 is a high-speed adder circuit that inputs an output from the total addition circuit.

The addition, subtraction and multiplication circuit 203 comprises the partial product generation circuit 202, the total addition circuit 221, the high-speed adder circuit 221, the register 241 and the selection circuit 232. This addition, subtraction and multiplication circuit 203 has a function to perform not only multiplication but also addition and subtraction.

Next, it is explained in detail how the addition, subtraction and multiplication circuit 203 performs addition, subtraction and multiplication.

First, how to perform addition A+B is explained. A constant number 1 stored in the ROM 40 is input to a multiplier side input of the partial product generation circuit 202, and B (or A) is input to a multiplicand side input of the partial product generation circuit 202. As a result, B (or A) is output from the partial product generation circuit 202. By setting input selection of the selection circuit 232 to the side of the switch 50, A (or B) stored in the multiport register file 30 data is input to the total addition circuit 212. Thus, A and B are input to the total addition circuit 212. A+B is calculated with the total addition circuit 212 and the high-speed adder circuit 221. Next, how to operate subtraction A−B is explained. A constant number −1 stored in the ROM is input to a multiplier side input of the partial product generation circuit 202, and B is input to a multiplicand side input of the partial product generation circuit 202. As a result, −B is output from the partial product generation circuit 202. Similarly to the above addition, the selection circuit 232 selects an input line from the switch 50. By this, A is input to the total addition circuit 212. Thus, A and −B are input to the total addition circuit 212. A−B is calculated with the total addition circuit 212 and the high-speed adder circuit 221.

Next, how to perform multiplication A×B is explained. A is input to a multiplier side input of the partial product generation circuit 202, and B is input to a multiplicand side input of the partial product generation circuit 202. Then, the partial product generation circuit 202 outputs a partial product of A×B. A×B is output to the total adder circuit 212. Meanwhile, selection circuit 202 outputs zero to the total adder circuit 212. The total adder circuit 212 and the high-speed adder circuit 221 add all partial products. Thus, A×B is calculated.

By the way, a case of calculation following to the calculation procedure of the Lee's high-speed algorithm of FIG. 2 using the present embodiment is explained. Similarly to the explanation for a prior art, first the addition A1 shown in FIG. 5, that is, the addition F(5)+F(3), is performed with the arithmetic and logic operation circuit 10, simultaneously the multiplication M1, that is, F(4)×C4, is performed with the addition, subtraction and multiplication circuit 203. In the next step, A2 that is F(1)+F(3), is performed with the arithmetic and logic operation circuit 10, simultaneously the multiplication M3 is performed with the addition, subtraction and multiplication circuit 203. Thus, the high-speed algorithm of FIG. 5 is calculated.

Figure 5:
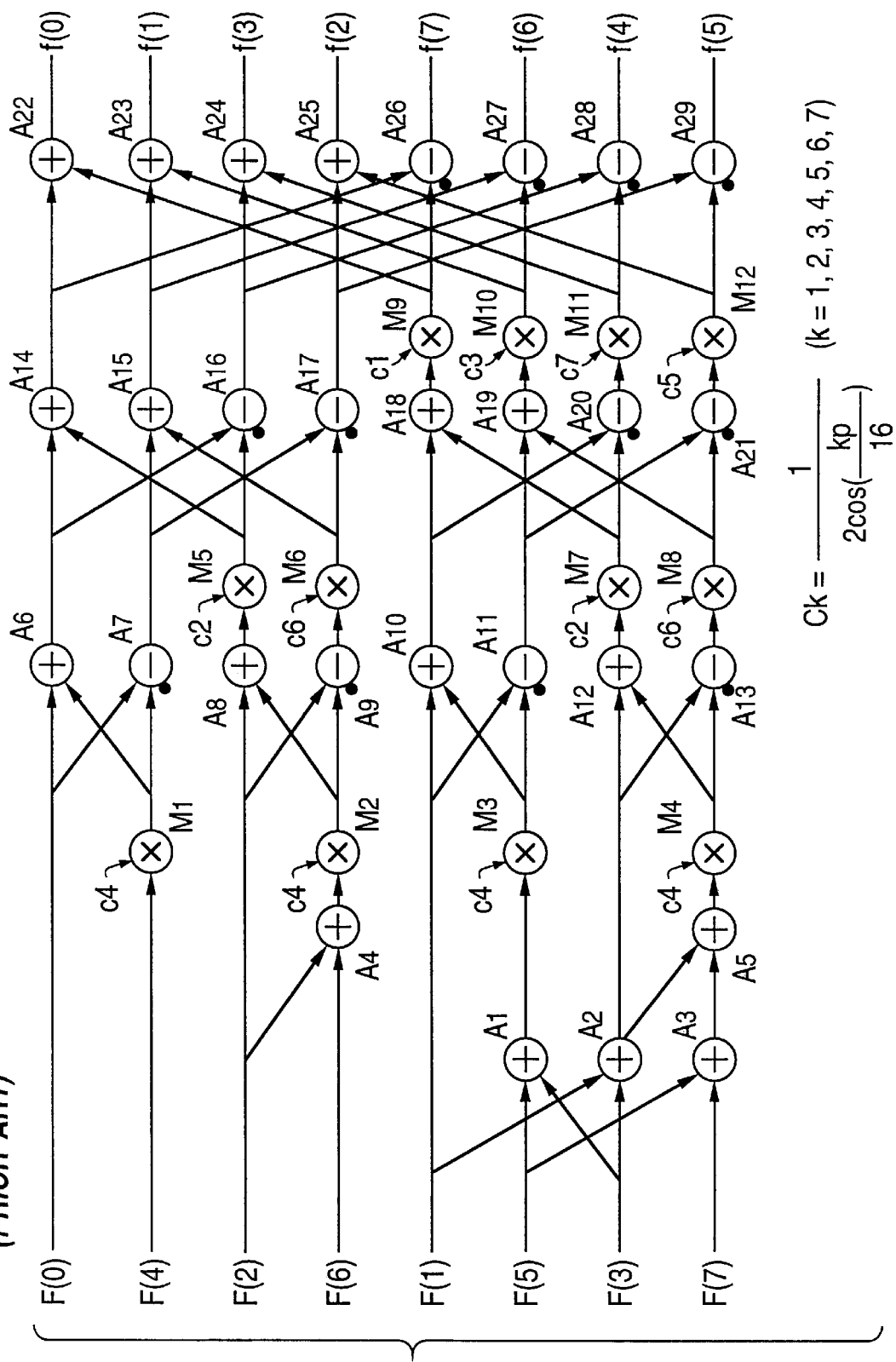
FIG. 5 is a figure showing an inverse cosine transformation high-speed algorithm.
Figure 6:
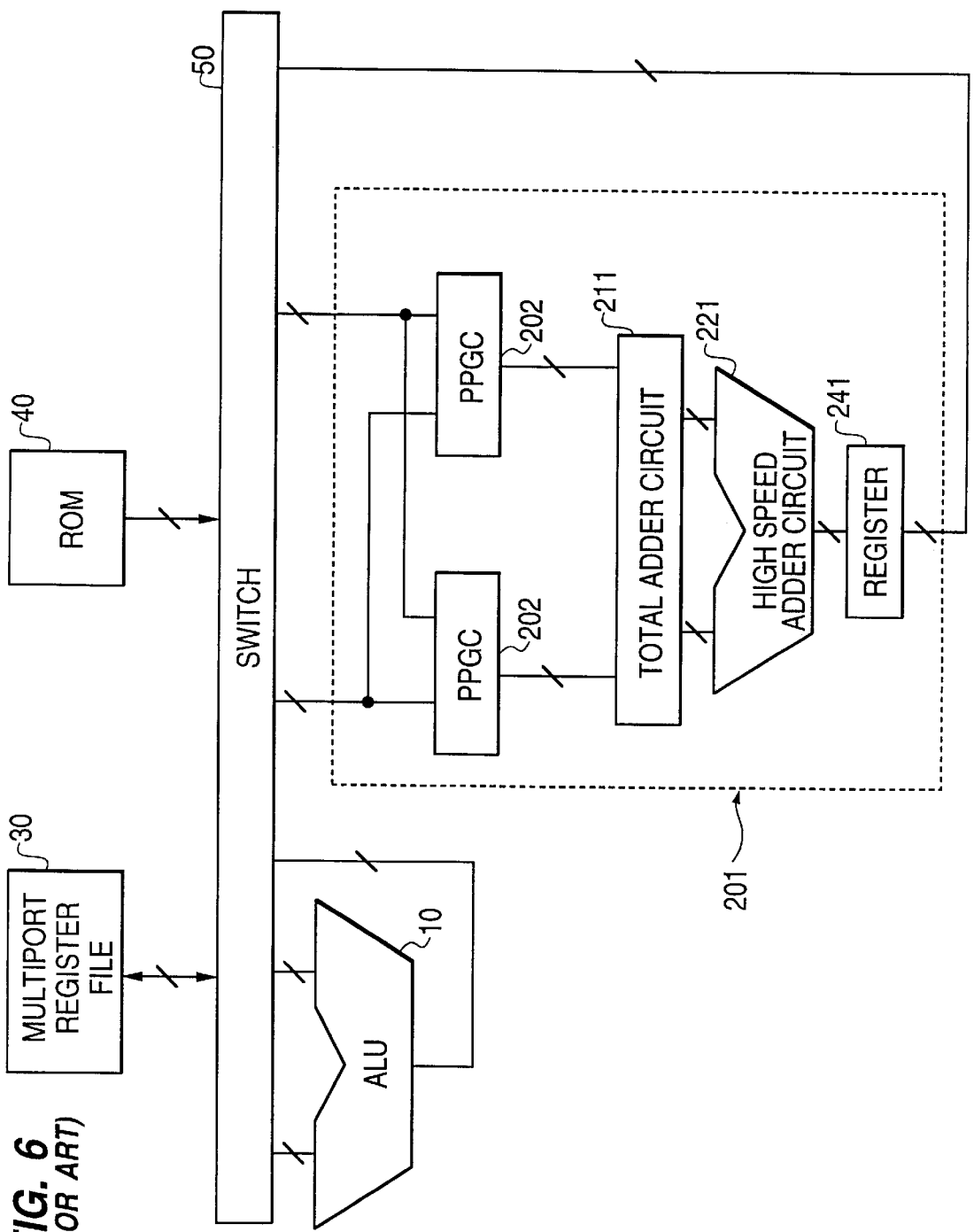
FIG. 6 is a block diagram of a prior orthogonal transformation processor.

Based on the above embodiment, the high-speed algorithm calculation for each step of FIG. 5 is shown in FIG. 2. In FIG. 2, one multiplication operation needs two steps, but a pipeline operation is possible and data input for each step is also possible. In addition, in this figure, the − mark with multiplication operation represents that no multiplication, addition or subtraction is operated. Through FIG. 2, it is found that a total of 21 steps are needed to perform IDCT processing with the 8 degree Lee's high-speed IDCT algorithm in the embodiment of FIG. 1.

Accordingly, the present invention can reduce the prior 29 steps to 21 steps with this embodiment, resulting in a reduction of the number of steps.

In addition, the work rate of an operation circuit represented by a ratio of working step of an operation circuit per total steps is 71% in the prior art, but 98% in the first embodiment, resulting in a high work rate. This is achieved by a multiplication circuit that enables to operate both addition and subtraction.

Next, a second embodiment is explained.

Figure 3:
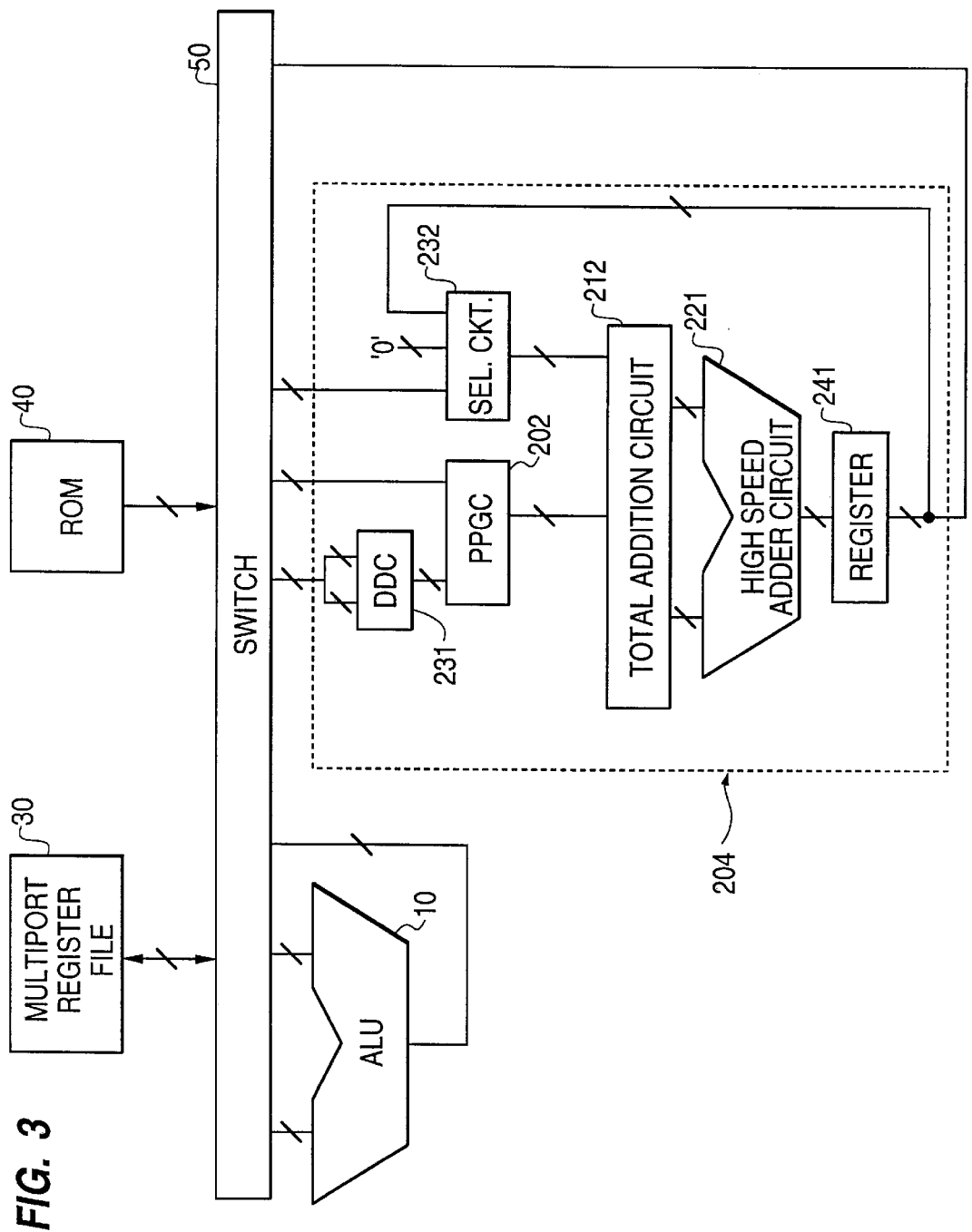
FIG. 3 is a block diagram of a second embodiment of the present invention.

FIG. 3 is a block diagram of the second embodiment. Here, constructions of the arithmetic and logic operation circuit 10, the ROM 40, the multiport register file 30 and the switch 50 are the same as those of the embodiment shown in FIG. 1, so explanations for them are omitted.

231 is a data division circuit (DDC) for dividing input data to upper bit and lower bit, outputting lower bit side in the first calculation cycle and outputting upper bit side in the second calculation cycle.

202 is a partial product generation circuit (PPGC) for generating a partial product of a multiplier and a multiplicand output by the data division circuit 231.

241 is a register for storing a multiplication result or an addition and/or subtraction result described later.

232 is a selection circuit. It selects a value zero in the first calculation cycle of multiplication, and it selects the output of the register 241 in the second calculation cycle of multiplication. Also, it selects one of added and subtracted number in the case of addition or subtraction.

The second embodiment comprises an addition, subtraction and multiplication circuit 204 that can perform addition, subtraction and multiplication. The addition, subtraction and multiplication circuit 204 comprises the data division circuit 231, the selection circuit 232, the partial product generation circuit 202, the total adder circuit 212 that inputs both outputs of the partial product generation circuit 202 and the selection circuit 232, and the high-speed adder circuit 221 that inputs the output of the total adder circuit 212.

Next, how to perform addition, subtraction and multiplication in the second embodiment is explained in detail.

First, the addition A+B is calculated as below.

A constant number 1 stored in the ROM is input to the multiplicand side input of the partial product generation circuit 202 and A is input to the data division circuit 231.

In the first calculation cycle, the lower bit side of A is output from the data division circuit 231 to the partial product generation circuit 202. The partial product generation circuit 202 generates a partial product of the lower bit side of A and 1, and outputs a resulted partial product. Meanwhile, the selection circuit 232 selects B.

A sum of the partial product and B, that is, a sum of the partial product of the A's lower bit side and B, is calculated with the total adder circuit 212 and the high-speed adder circuit 221, and a result is stored in the register 241.

In the next calculation cycle, the upper bit side of A is output from the data division circuit 231 to the partial product generation circuit 202. The partial product generation circuit 202 generates a partial product of the upper bit side of A and 1, and outputs a resulted partial product. Meanwhile, the selection circuit 232 selects the output of the register 241 and outputs it.

Then, a total sum of a partial product of A's upper bit side and 1 and a sum of the partial product of the A's lower bit side and B from the register 241 is calculated with the total adder circuit 212 and the high-speed adder circuit 221. The result is stored in the register 241.

Thus, A+B is stored in the register. Here, it is to be noted that it is necessary to adjust carry for adding the sum of the partial product of the A's lower bit side and B stored in the register 241 at the first calculation cycle and the partial product of A's upper bit side and 1 output from the partial product generation circuit 202 at the second calculation cycle with the total adder circuit 212 and the high-speed adder circuit 202.

Next, subtraction A−B is explained as below.

A constant number −1 stored in the ROM 40 is input to a multiplicand side input of the partial product generation circuit 202 and B is input to the data division circuit 231.

In the first calculation cycle, the B's lower bit side is output from the data division circuit 231 to the partial product generation circuit 202. The partial product generation circuit 202 generates a partial product of B's lower bit side and −1 and outputs the result. Meanwhile, the selection circuit selects A and outputs it.

Then, a sum of the partial product and A, that is, a sum of the partial product of the B's lower bit side and −1, and A is calculated with the total adder circuit 212 and the high-speed adder circuit 221.

In the next calculation cycle, the upper bit side of B is output from the data division circuit 231 to the partial product generation circuit 202. The partial product generation circuit 202 generates a partial product of the upper bit side of B and −1, and outputs a resulted partial product. Meanwhile, the selection circuit 232 selects the output of the register 241 and outputs it.

Then, a total sum of a partial product of B's upper bit side and −1 and a sum of the partial product of the B's lower bit side and A from the register 241 is calculated with the total adder circuit 212 and the high-speed adder circuit 221. The result is stored in the register 241.

Thus, A−B is stored in the register. Here, it is to be noted that it is necessary to adjust carry for adding the calculation result of the register 241 stored at the first calculation cycle and the partial product of B's upper bit side and −1 output from the partial product generation circuit 202 at the second calculation cycle with the total adder circuit 212 and the high-speed adder circuit 221.

Multiplication A×B is calculated as below.

B is input to the multiplicand side input of the partial product generation circuit 202 and A is input to the data division circuit 231.

In the first calculation cycle, a partial product of the multiplier A's lower bit side and the multiplicand B is output based on the multiplier A's lower bit side supplied from the data division circuit 231 to the partial product generation circuit 202 and the multiplicand B. Meanwhile, the selection circuit 232 selects zero.

A sum of the partial products and zero is calculated with the total adder circuit 212 and the high-speed adder circuit 221, and a product of the multiplier A's lower bit side and the multiplicand B is stored in the register 241.

In the next calculation cycle, a partial product of the multiplier A's upper bit side and the multiplicand B is output based on the multiplier A's upper bit side supplied from the data division circuit 231 to the partial product generation circuit 202 and the multiplicand B. Meanwhile, the selection circuit 232 selects an output of the register 241.

A total sum of the partial product of the multiplier A's upper bit side and the multiplicand B and the partial product stored in the register 241 of the multiplier A's lower bit side and the multiplicand B is calculated with the total adder circuit 212 and the high-speed adder circuit 221, and a result is stored in the register 241.

Thus, A×B is stored in the register.

Here, it is to be noted that it is necessary to adjust carry for adding the sum of the partial product of the A's lower bit side and the multiplicand B stored in the register 241 at the first calculation cycle and the partial product of A's upper bit side and the multiplicand B output from the partial product generation circuit 202 at the second calculation cycle with the total adder circuit 212 and the high-speed adder circuit 221.

Here, a case of calculation following to the calculation procedure of the Lee's high-speed algorithm of FIG. 5 using the second embodiment is explained.

Similarly to the explanation for the first embodiment, first, the addition A1 shown in FIG. 5, that is, the addition F(5)+F(3), is performed with the arithmetic and logic operation circuit 10, simultaneously the multiplication M1, that is, F(4)×C4, is performed with the addition, subtraction and multiplication circuit 203.

In the next step, A2, that is, F(1)+F(3), is performed with the arithmetic and logic operation circuit 10, simultaneously the multiplication M3 is performed with the addition, subtraction and multiplication circuit 203. Thus, the high-speed algorithm of FIG. 5 is calculated.

Based on the above second embodiment, the high-speed algorithm calculation for each step of FIG. 5 is shown in FIG. 4.

In this second embodiment, one multiplication operation needs two steps, so the addition, subtraction and multiplication circuit 203 of the present invention does not input data at the second step. In FIG. 4, the second step of each operation is put in parentheses to show that it is under calculation. In addition, in FIG. 4, the − mark represents that no multiplication, addition or subtraction is performed.

Through FIG. 4, it is found that total 28 steps are needed to perform IDCT processing with the 8 degree Lee's high-speed IDCT algorithm.

The second embodiment needs 28 calculation steps, but it can reduce the size of the multiplication circuit to a half of a prior art. Comparing a hardware quantity of the addition, subtraction and multiplication circuit of the present invention with that of a prior multiplication circuit, it is found that the hardware quantity of the addition, subtraction and multiplication circuit of the present invention is 70% of that of the prior multiplication circuit.

It is to be noted that the calculation cycle is 2 and the multiplier is divided to upper bit side and lower bit side to be output in the present embodiment, however, the calculation cycle is not limited to 2. For example, it is possible to set the calculation cycle to 3 and to have 3 multiplier divisions, such as upper bit, middle bit, and lower bit.

What is claimed is:

1. An orthogonal transformation processing device comprising:

multiplication means;

addition means;

selection means, in which a first data, a second data, a constant number 1, a constant number −1 and a constant number zero are input, for:

outputting said first data and said constant number 1, to said multiplication means and also outputting said second data to said addition means when adding said first data and said second data;

outputting said first data and said constant number −1, to said multiplication means and also outputting said second data to said addition means when subtracting said first data from said second data;

outputting said first data and said second data, to said multiplication means and also outputting said constant number zero to said addition means when multiplying said first data by said second data; and wherein said multiplication means multiplies two input values provided thereto and outputs a multiplication result to said addition means, said addition means adds said multiplication result and a value output from said selection means and outputs a result.

2. The orthogonal transformation processing device of claim 1, wherein said multiplication means comprises a plurality of partial product calculation sections for calculating a partial product of a multiplier and a multiplicand.

3. The orthogonal transformation processing device of claim 1, wherein said addition means comprises:

a total addition section that inputs a multiplication result of said multiplication means and an output of said selection means; and a high-speed addition section that inputs an output of said total addition means.

4. The orthogonal transformation processing device of claim 1, wherein said selection means comprises a first selector and second selector, wherein said first selector inputs a first data, a second data, a constant number 1 and a constant number −1, and outputs said first data and said constant number 1 to said multiplication means and outputs said second data to said second selector when adding said first data and said second data;

outputs said first data and said constant number −1 to said multiplication means and outputs said second data to said second selector when subtracting said first data from said second data;

outputs said first data and said second data to said multiplication means; and said second selector inputs said second data output from said first selector and a constant number zero, and outputs said second data to said addition means when adding said first data and said second data;

outputs said second data to said addition means when subtracting said first data from said second data; and outputs said constant number zero to said addition means when multiplying said first data by said second data.

5. The orthogonal transformation processing device of claim 4, wherein said first selector and said second selector are arranged in a hierarchical relationship with respect to each other, with said first selector directly providing data to said second selector, said data being obtained by said first selector from one of a memory and a multiport register file, and with said first selector not receiving data directly from said first selector, wherein said memory stores coefficient data, and wherein said multiport register file stores a calculation result.

6. The orthogonal transformation processing device of claim 1, wherein said orthogonal transformation is a Discrete Cosine Transformation.

7. The orthogonal transformation processing device of claim 1, wherein said orthogonal transformation is an Inverse Discrete Cosine Transformation.

8. An orthogonal transformation processing device for orthogonal transformation processing, comprising:

storing means for storing coefficient data and a constant number;

a multiport register file for storing a calculation result;

an arithmetic operation means for adding and subtracting two input data;

addition, subtraction and multiplication means having a multiplication means, addition means and a register for storing a calculation result of said addition means;

a first selection means for storing a calculation result of said arithmetic operation means and a calculation result stored in said register to said multiport register file; and a second selection means, wherein said first selection means:

inputs a first data and a second data output from one of said storing means and said multiport register file, and one of a constant number 1 and a constant number −1 output from said storing means;

outputs said first data and said second data to said arithmetic operation means when adding or subtracting said first data and said second data;

outputs said first data and said second data to said multiplication means when multiplying said first data by said second data with said addition, subtraction and multiplication means;

outputs said first data and said second data to said multiplication means and outputs said second data to said second selection means when adding said first data and said second data with said addition, subtraction and multiplication means;

outputs said first data and said constant number −1 to said multiplication means and outputs said second data to said second selection means when subtracting said first data and said second data with said addition, subtraction and multiplication means; and said second selection means:

outputs said second data received from said first selection means to said addition means when adding said first data and said second data with said addition, subtraction and multiplication means;

outputs said second data received from said first selection means to said addition means when subtracting said first data from said second data with said addition, subtraction and multiplication means;

outputs said constant number zero to said addition means when multiplying said first data by said second data with said addition, subtraction and multiplication means;

said multiplication means multiplies two input data provided thereto and outputs a multiplication result to said addition means; and said addition means adds said multiplication result and data output from said second selection means and outputs a result to said register.

9. The orthogonal transformation processing device of claim 8, wherein said orthogonal transformation is a Discrete Cosine Transformation.

10. The orthogonal transformation processing device of claim 8, wherein said orthogonal transformation is an Inverse Discrete Cosine Transformation.

11. The orthogonal transformation processing device of claim 8, wherein said first selection means and said second selection means are arranged in a hierarchical relationship with respect to each other, with said first selection means directly providing data to said second selection means, said data being obtained by said first selection means from one of: a) said arithmetic operation means, b) said storing means, c) said multiport register file, and d) said register of said addition, subtraction and multiplication means, and with said first selection means not receiving data directly from said first selection means.

12. An orthogonal transformation processing device for orthogonal transformation processing, comprising a first selection means, a second selection means, data division means, multiplication means, addition means and a register for storing an operation result of said addition means, wherein said first selection means:

inputs a first data, a second data, a constant number 1 and a constant number −1;

outputs said first data to said data division means, outputs constant number 1 to said multiplication means and outputs said second data to said second selection means when adding said first data and said second data;

outputs said first data to said data division means, outputs said constant number −1 to said multiplication means and outputs said second data to said second selection means when subtracting said first data from said second data;

outputs said first data to said data division means and outputs said second data to said multiplication means when multiplying said first data by said second data;

said data division means divides said first data to N bit strings and outputs the N bit strings in N cycles, N being a natural number;

said second selection means:

outputs said second data to said addition means only in one cycle within said N cycles and outputs a calculation result of said addition means stored in said register to said addition means in the other cycles than said one cycle, when adding said first data and said second data;

outputs said second data to said addition means only in one cycle within said N cycles and outputs a calculation result of said addition means stored in said register to said addition means in the other cycles than said one cycle, when subtracting said first data from said second data;

outputs said constant number zero to said addition means only in one cycle within said N cycles and outputs a calculation result of said addition means stored in said register to said addition means in the other cycles than said one cycle, when multiplying said first data by said second data; and said multiplication means multiplies two input data values provided thereto and outputs a calculation result to said addition means; and said addition means adds said multiplication result and a value output from said second selection means and outputs a result to said register.

13. The orthogonal transformation processing device of claim 12, wherein said addition means comprises:

a total addition section that inputs a multiplication result of said multiplication means and an output of said selection means; and a high-speed addition section that inputs an output of said total addition means.

14. The orthogonal transformation processing device of claim 12, wherein said orthogonal transformation is a Discrete Cosine Transformation.

15. The orthogonal transformation processing device of claim 12, wherein said orthogonal transformation is an Inverse Discrete Cosine Transformation.

16. An orthogonal transformation processing device for orthogonal transformation processing, comprising:

storing means for storing coefficient data and a constant number;

a multiport register file for storing a calculation result;

an arithmetic operation means for adding and subtracting two input data;

addition, subtraction and multiplication means having a multiplication means, addition means and a register for storing a calculation result of said addition means;

a first selection means for storing a calculation result of said arithmetic operation means and a calculation result stored in said register to said multiport register file;

a second selection means; and data division means, wherein said first selection means:

inputs a first data and a second data output from one of said storing means and said multiport register file, and one of a constant number 1 and a constant number −1 output from said storing means;

outputs said first data and said second data to said arithmetic operation means when adding or subtracting said first data and said second data;

outputs said first data to said data division means, outputs said constant number 1 to said multiplication means and outputs said second data to said second selection means when adding said first data and said second data with said addition, subtraction and multiplication means;

outputs said first data to said data division means, outputs said constant number −1 to said multiplication means and outputs said second data to said second selection means when subtracting said first data from said second data with said addition, subtraction and multiplication means; and outputs said first data to said data division means and outputs said second data to said multiplication means when multiplying said first data by said second data with said addition, subtraction and multiplication means; and said data division means divides said first data to N bit strings and outputs the N bit strings in N cycles, N being a natural number;

said second selection means:

outputs said second data to said addition means only in one cycle within said N cycles and outputs a calculation result of said addition means stored in said register to said addition means in the other cycles than said one cycle, when adding said first data and said second data with said addition, subtraction and multiplication means;

outputs said second data to said addition means only in one cycle within said N cycles and outputs a calculation result of said addition means stored in said register to said addition means in the other cycles than said one cycle, when subtracting said first data from said second data with said addition, subtraction and multiplication means;

outputs said constant number zero to said addition means only in one cycle within said N cycles and outputs a calculation result of said addition means stored in said register to said addition means in the other cycles than said one cycle, when multiplying said first data by said second data; and said multiplication means multiplies two input data values provided thereto and outputs a calculation result to said addition means; and said addition means adds said multiplication result and a value output from said second selection means and outputs a result to said register.

17. The orthogonal transformation processing device of claim 16, wherein said addition means comprises:

a total addition section that inputs a multiplication result of said multiplication means and an output of said selection means; and a high-speed addition section that inputs an output of said total addition means.

18. The orthogonal transformation processing device of claim 16, wherein said orthogonal transformation is a Discrete Cosine Transformation.

19. The orthogonal transformation processing device of claim 16, wherein said orthogonal transformation is an Inverse Discrete Cosine Transformation.

20. The orthogonal transformation processing device of claim 16, wherein said first selection means and said second selection means are arranged in a hierarchical relationship with respect to each other, with said first selection means directly providing data to said second selection means, said data being obtained by said first selection means from one of: a) said arithmetic operation means, b) said storing means, c) said multiport register file, and d) said register of said addition, subtraction and multiplication means, and with said first selection means not receiving data directly from said first selection means.

* * * * *